Feb. 26, 1935.  W. G. WILSON  1,992,272

MECHANICAL LOCK

Original Filed Dec. 20, 1930

INVENTOR
Wylie G. Wilson
BY
his ATTORNEYS

Patented Feb. 26, 1935

1,992,272

UNITED STATES PATENT OFFICE 1,992,272

MECHANICAL LOCK

Wylie G. Wilson, Elizabeth, N. J., assignor to Wilson Locknut Company, Jersey City, N. J., a corporation of Delaware Application December 20, 1930, Serial No. 503,729
Renewed July 20, 1934. In Canada November 12, 1930

5 Claims.   (Cl. 151—21)

The invention relates to locking devices and more particularly to locking devices of the character commonly known as "nut locks."

Heretofore, locking devices of various characters have been employed for preventing undesired removal of nuts from bolts, but faults have been found with the devices, due to mutilation of bolt threads, etc.

An object of the present invention is to provide locking devices for retaining nuts on bolts, which devices are simple to manufacture, inexpensive and efficient in operation.

According to the present invention, the locking devices thereof consist broadly of an apertured body having one surface in substantially the shape of a truncated cone, and another surface modified or built in such a way as to provide a reinforcement for the body, which reinforcement serves to more effectively retain the body in locking engagement with the bolt. Specifically, the invention in one form consists of an apertured body which has one surface substantially in the shape of a truncated cone and another surface parallel with the first surface for a short length and then branching into an annular extension which is so shaped as to lie concentric with the axis of a bolt which is in threaded engagement with an aperture of the body. The member, having its aperture threaded, can be screwed on to a bolt into contact with a nut thereon and clinched by deforming the body in a direction parallel to the axis of the bolt, whereby the wall of the aperture is contracted to grip the bolt, the reinforcing member being at the outer extremity of the member and being in the form of an annular extension surface to prevent any rupture of the body during the distorting thereof.

The invention in another form consists of an apertured body which has one surface in the shape of a truncated cone and another surface parallel to the first extending from the outer edge of the aperture of the body to a point at which the surface is broken due to a reinforcing extension which, in effect, produces a prolongation of the aperture wall in a direction away from the nut against which the member rests. This body is clinched on the bolt in the same manner by distortion, due to which the wall of the aperture engages the bolt with such force as to prevent the body being removed from the bolt without the application of destructive force to the same.

In another form the invention consists of an apertured body having one surface in the shape substantially of a truncated cone, the outer portion of the body being provided with an annular reinforcing part somewhat similar to that explained in connection with the first embodiment of the invention, and further provided with a second reinforcing portion which forms a prolongation of the aperture wall. These reinforcing portions are separated from each other as shown. This member is locked on to a bolt by the application of force to distort the same in the same manner as before set forth so that the wall of the aperture clinches the bolt firmly.

Other features, objects and advantages of the invention will be readily apparent by reference to the following detail description, together with the accompanying drawing forming a part of the same, wherein.

Figure 1:
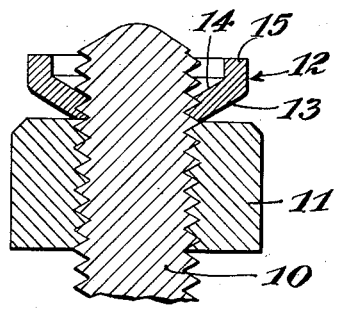
Figure 1 is a longitudinal section of an assembly of bolt, nut and locking device constructed in accordance with the invention.
Figure 2:
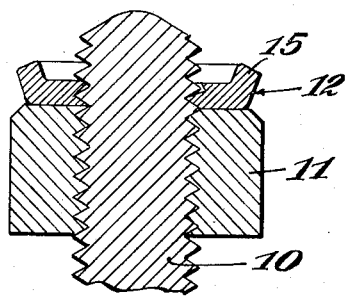
Figure 2 is a similar section of the same assembly showing the locking device clinched on the bolt.

Referring now to the drawing and particularly to Figures 1 and 2, 10 indicates the threaded part of a bolt on which is positioned a nut 11 of conventional type. In order that the nut 11 may be locked on the bolt in such a manner that it cannot be withdrawn therefrom, use is made of the locking device 12, which comprises a body having one surface 13 in substantially the shape of a truncated cone, and another surface 14 which is substantially parallel to surface 13. Extending upwardly from the outer edge of member 12 is a reinforcing portion 15, annular in form and of thickness corresponding to the thickness of the main portion of the body, that is, the thickness as defined by surfaces 13 and 14. Body 12 is provided with a central aperture which is threaded as shown to engage the threads of portion 10.

The assembly and use of the locking device as shown in Figures 1 and 2 is as follows: The nut 11 is screwed on to the threaded portion 10 of a bolt into contact with the article to be retained on the bolt (not shown), the nut being tightened as much as possible, after which the member 12 is introduced on to the bolt in such fashion that the reinforcing extension 15 extends away from the nut as shown. With the locking member in this position, it can be clinched on the bolt by the application of force through the agency of a special tool which has a portion in the shape of a tube so that it may be introduced over the end of the bolt with the annular edge thereof resting against surface 14. By striking the end of the tool repeated blows, the member 12 is distorted into the shape shown in Figure 2, thereby contracting a part of the wall of the aperture of this member so that this aperture wall grips the threads of the bolt with unyielding force.

To remove the member 12 from the bolt it is necessary to make use of destructive force such as may be applied through the agency of a cold chisel to actually destroy the effectiveness of the locking device so far as future use is concerned. When the locking device is actually split by means of a cold chisel it can be readily removed from the bolt and then the nut 11 also removed. Due to the fact that the aperture of the member is threaded and since the aperture wall grips the threads of the bolt, these latter threads are not mutilated in any way by the locking device, so that the bolt can be used indefinitely in conjunction with similar locking devices.

Figure 3:
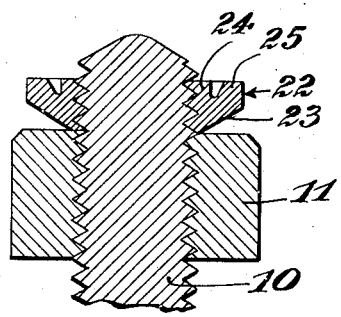
Figure 3 is a section similar to Figure 1 of an assembly including a locking device of a modified form.
Figure 4:
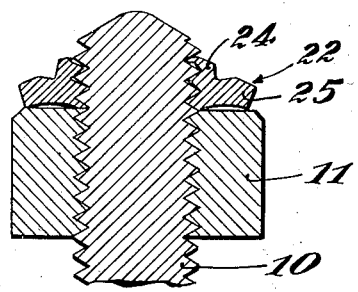
Figure 4 is a similar section showing the same assembly as Figure 3 with the locking device clinched on the bolt.

In Figures 3 and 4 the locking device 22 is used in conjunction with the threaded end of a bolt 10 and nut 11 similar to those shown in Figures 1 and 2. The member 22 consists of an apertured body having one surface 23 in substantially the shape of a truncated cone, the body being provided with an annular extension or reinforcing portion 24, which is so positioned as to form a prolongation of the wall of the central aperture of the body and affording a substantial thickness to this prolongation. The body 22 is also provided with an annular reinforcing extension 25 positioned near the outer edge of the member. These two reinforcing portions are separated as shown in Figure 3. The wall of the central aperture has threads cut therein, as before.

The operation in use of the modification shown in these figures is similar to that described hereinbefore, in that the nut 11 is screwed tightly on the bolt 10, and then member 22 secured on to the bolt to cause the lower edge of the aperture wall to contact with the nut head. In this position the member is clinched by the application of force through the agency of a similar tool which distorts the member into the position shown in Figure 4, contracting a part of the aperture wall so it firmly clinches the threads of the bolt. The reinforcing portion 24 adds strength to the aperture wall, while the reinforcing portion 25 serves to prevent splitting of the member during distorting thereof. When it is desired to remove locking member 22, it is necessary to apply destructive force as by a cold chisel in the manner before described, thereby splitting the member and permitting it to be unscrewed from the bolt. As in the preceding form of the invention, the provision of threads in the aperture wall of the member, which threads engage the threads of the bolt, prevents mutilation of the bolt threads so that the life of the bolt is not interfered with in any manner.

Figure 5:
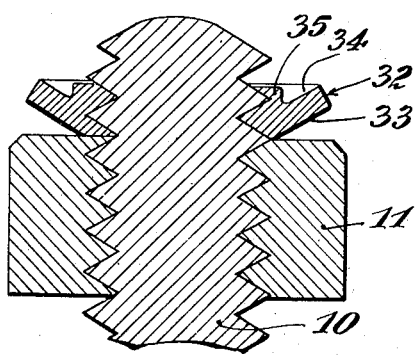
Figure 5 is a section similar to Figures 1 and 3 of an assembly including a locking device of a still further modified form.
Figure 6:
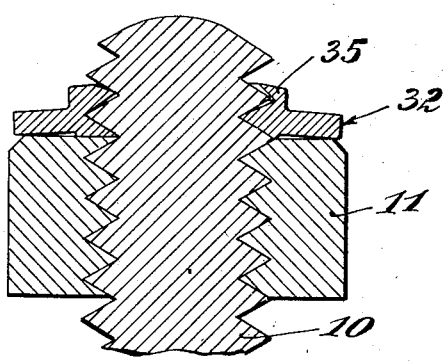
Figure 6 is a similar section of the assembly of Figure 5 with the locking device clinched on the bolt.

In Figures 5 and 6 a still further modification of the invention is shown, consisting of a locking member 32 especially designed to be used in conjunction with heavy bolts having heavy threads. As before, the assembly consists of a threaded end of a bolt 10 and nut 11 thereon, together with the locking member 32. This locking member is composed of a body having a central aperture, the wall of which is threaded and a surface 33 in substantially the shape of a truncated cone. The body is also provided with a surface 34 extending from the outer edge thereof toward the center and substantially parallel to surface 33. The surface 34, however, is interrupted due to a reinforcing part 35 which forms in effect a prolongation of the aperture wall, which enlargement 35 is of such size as to permit the continuation of the threads of the aperture.

The component parts of the assembly are assembled in the same manner as explained in conjunction with Figures 1 to 4 inclusive, the member 32 being locked on the bolt by the application of distorting force to contract the aperture wall and to flatten out that portion of the body lying between surfaces 33 and 34. In this position, it is impossible to remove the nut 11 without first removing member 32, which can be removed only after the same has been subjected to destructive force by means of a cold chisel or other suitable tool. As explained hereinbefore, the provision of threads in the aperture wall which clinches threads of the bolt prevents mutilation of the bolt threads, so that the longevity of such bolt threads is not reduced.

From the foregoing it will be seen that the present invention provides simple and efficient locking members for retaining nuts on bolts without interfering in any manner with the function of such nut and bolt. In view of this it is to be understood that the invention is not to be limited to the illustrated embodiments but is to be limited only by the scope of the following claims:

I claim:

1. A clamping member comprising a deformable body having a surface thereof in the shape substantially of a truncated cone, said body having an aperture, the wall of which is cut with screw threads for cooperation with the screw threads of a bolt, said body being provided with a reinforcing portion integral therewith, said member being adapted to be clamped on the bolt by deforming part of the body in a direction paralleled to the axis of the bolt, thereby constricting the aperture and causing the part of the wall thereof most remote from the reinforcing portion to grip the bolt.

2. A clamping member comprising a deformable body having a surface thereof in the shape substantially of a truncated cone, said body having an aperture, the wall of which is cut with screw threads for cooperation with the screw threads of a bolt, said body being provided with an annular reinforcing portion integral therewith, said member being adapted to be clamped on the bolt by deforming part of the body in a direction parallel to the axis of the bolt to force a part of said conical surface into contact with a nut on said bolt, thereby constricting the aperture and causing the part of the wall thereof most remote from said reinforcing portion to grip the bolt.

3. A clamping member comprising a deformable body having a surface thereof in the shape substantially of a truncated cone, said body having an aperture, the wall of which is cut with screw threads for cooperation with the screw threads of a bolt, said body being provided with an annular reinforcing portion extending from the outer edge of the body in a direction substantially parallel to the axis of said bolt, said member being adapted to be clamped on the bolt by deforming part of the body in a direction parallel to the axis of the bolt thereby constricting the operation and causing the wall thereof to grip the bolt.

4. A clamping member comprising a deformable body having a surface thereof in the shape substantially of a truncated cone, said body having an aperture, the wall of which is cut with screw threads for cooperation with the screw threads of a bolt, said body being provided with an annular reinforcing portion forming a prolongation of the aperture wall, said member being adapted to be clamped on the bolt by deforming part of the body in a direction parallel to the axis of the bolt and away from the reinforcing portion thereby constricting the operation and causing the wall thereof to grip the bolt.

5. A clamping member comprising a deformable body having a surface thereof in the shape substantially of a truncated cone, said body having an aperture, the wall of which is cut with screw threads for cooperation with the screw threads of a bolt, said body being provided with an annular reinforcing portion extending from the outer edge of the body in a direction substantially parallel to the axis of said bolt and an annular reinforcing portion forming a prolongation of the aperture wall, said member being adapted to be clamped on the bolt by deforming part of the body in a direction parallel to the axis of the bolt thereby constricting the operation and causing the wall thereof to grip the bolt.

WYLIE G. WILSON.